(12) United States Patent  
Martinez

(10) Patent No.: US 10,482,279 B2
(45) Date of Patent: Nov. 19, 2019

(54) PATTERN-LESS PRIVATE DATA DETECTION ON DATA SETS

(71) Applicant: Microsoft Technology Licensing, LLC, Redmond, WA (US)

(72) Inventor: Daniel Peña Martinez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 15/346,271

(22) Filed: Nov. 8, 2016

(65) Prior Publication Data

US 2018/0129822 A1 May 10, 2018

(51) Int. Cl.
*G06F 21/62* (2013.01)

(52) U.S. Cl.
CPC ...... *G06F 21/6245* (2013.01); *G06F 21/6227* (2013.01)

(58) Field of Classification Search
CPC ............ G06F 21/6245; G06F 21/6227; G06F 21/6263; G06F 21/604; G06F 21/62; G06F 21/88
See application file for complete search history.

(56) References Cited

U.S. PATENT DOCUMENTS

| | | |
|---|---|---|
| 7,885,944 B1 | 2/2011 | Bruening |
| 8,127,360 B1 | 2/2012 | Wilhelm et al. |
| 8,166,313 B2 | 4/2012 | Fedtke |
| 8,732,821 B1 | 5/2014 | Spertus |
| 8,789,181 B2 * | 7/2014 | Blackwell ............. G06F 21/554 726/22 |
| 9,104,659 B2 | 8/2015 | Treadwell et al. |
| 9,361,085 B2 | 6/2016 | El-Gillani |
| 2008/0059414 A1 * | 3/2008 | Cristofor ............... H04L 9/3236 |
| 2010/0318489 A1 * | 12/2010 | De Barros ............... G06N 5/04 706/50 |
| 2011/0040983 A1 * | 2/2011 | Grzymala-Busse ........................ G06F 21/6245 713/189 |
| 2011/0289590 A1 * | 11/2011 | Miettinen ........... G06F 21/6245 726/26 |
| 2012/0116923 A1 * | 5/2012 | Irving ................. G06Q 30/0609 705/27.1 |
| 2012/0180137 A1 | 7/2012 | Liu |
| 2013/0167192 A1 | 6/2013 | Hickman et al. |
| 2015/0242633 A1 * | 8/2015 | Galil ..................... G06F 21/552 726/1 |

(Continued)

OTHER PUBLICATIONS

NIST, Guide to Protecting the Confidentiality of Personally Identifiable Information (PII), 59 pages (Year: 2010).*

(Continued)

*Primary Examiner* — Huan V Doan
(74) *Attorney, Agent, or Firm* — Workman Nydegger

(57) ABSTRACT

In an embodiment, data that is associated with one or more parameters that describe information corresponding to the data is accessed. The data is organized into data sets having the same combination of parameters. Each data set includes a data value determined by the combination of the parameters. The data values that are unique in relation to the other data values are determined. The likelihood that the accessed data includes PII data for the combination of parameters is determined based on the data values that are determined to be unique.

20 Claims, 7 Drawing Sheets

(56) References Cited

U.S. PATENT DOCUMENTS

| | | |
|---|---|---|
| 2015/0324606 A1 | 11/2015 | Grondin et al. |
| 2015/0326601 A1* | 11/2015 | Grondin ............ G06Q 10/0635 |
| | | 726/25 |
| 2016/0092557 A1 | 3/2016 | Stojanovic et al. |
| 2017/0139674 A1* | 5/2017 | Arasan .............. G06F 17/30522 |
| 2017/0329972 A1* | 11/2017 | Brisebois ............ G06F 21/6218 |

OTHER PUBLICATIONS

Sagiroglu, et al., "Big Data: A Review", In Proceedings of International Conference on Collaboration Technologies and Systems, May 20, 2013, pp. 42-47.

\* cited by examiner

| | Device ID | Time Stamp | Parameter | Parameter | Parameter | Value |
|---|---|---|---|---|---|---|
| 301a | 1 | 10/26/2016 11:22:01 | Internet Explorer | Page Render | URL/Server | www.bing.com |
| 301b | 1 | 10/26/2016 11:49:31 | Internet Explorer | Page Render | URL/Server | www.bing.com |
| 302 | 2 | 10/26/2016 13:00:08 | Internet Explorer | Page Render | URL/Server | www.bing.com/maps/address 1 |
| 303 | 3 | 10/26/2016 12:25:56 | Internet Explorer | Page Render | URL/Server | www.bing.com |
| 304 | 4 | 10/26/2016 11:35:15 | Internet Explorer | Page Render | URL/Server | www.bing.com/maps/address 2 |
| 305 | 5 | 10/26/2016 13:22:08 | Internet Explorer | Page Render | URL/Server | www.bing.com |
| 306 | 6 | 10/26/2016 12:42:12 | Internet Explorer | Page Render | URL/Server | www.bing.com |
| 307 | 7 | 10/26/2016 11:22:01 | Internet Explorer | Page Render | URL/Server | www.bing.com/random |
| 308 | 8 | 10/26/2016 12:56:33 | Internet Explorer | Page Render | URL/Server | www.bing.com |
| 309 | 9 | 10/26/2016 13:23:45 | Internet Explorer | Page Render | URL/Server | www.bing.com |
| 310 | 10 | 10/26/2016 12:13:47 | Internet Explorer | Page Render | URL/Server | www.bing.com/random |
| 311 | 11 | 10/26/2016 13:05:17 | Internet Explorer | Page Render | URL/Server | www.bing.com/maps/address 3 |

*Figure 3A*

| Device ID | Parameter | Parameter | Parameter | Value |
|---|---|---|---|---|
| 1 | Internet Explorer | Page Render | URL/Server | www.bing.com |
| 2 | Internet Explorer | Page Render | URL/Server | www.bing.com/maps/address 1 |
| 3 | Internet Explorer | Page Render | URL/Server | www.bing.com |
| 4 | Internet Explorer | Page Render | URL/Server | www.bing.com/maps/address 2 |
| 5 | Internet Explorer | Page Render | URL/Server | www.bing.com |
| 6 | Internet Explorer | Page Render | URL/Server | www.bing.com |
| 7 | Internet Explorer | Page Render | URL/Server | www.bing.com/random |
| 8 | Internet Explorer | Page Render | URL/Server | www.bing.com |
| 9 | Internet Explorer | Page Render | URL/Server | www.bing.com |
| 10 | Internet Explorer | Page Render | URL/Server | www.bing.com/random |
| 11 | Internet Explorer | Page Render | URL/Server | www.bing.com/maps/address 3 |
| ... | ... | ... | ... | ... |

*Figure 3B*

| Device ID 320 | Parameter 340 | Parameter 350 | Parameter 360 | Value 370 | Uniqueness Index 390 |
|---|---|---|---|---|---|
| 301a — 1 | Internet Explorer | Page Render | URL/Server | 371a — www.bing.com | Low/ No — 391 |
| 302 — 2 | Internet Explorer | Page Render | URL/Server 372 | www.bing.com/maps/address 1 | High/ Yes — 392 |
| 303 — 3 | Internet Explorer | Page Render | URL/Server | 373 — www.bing.com | Low/ No — 393 |
| 304 — 4 | Internet Explorer | Page Render | URL/Server 374 | www.bing.com/maps/address 2 | High/ Yes — 394 |
| 305 — 5 | Internet Explorer | Page Render | URL/Server | 375 — www.bing.com | Low/ No — 395 |
| 306 — 6 | Internet Explorer | Page Render | URL/Server | 376 — www.bing.com | Low/ No — 396 |
| 307 — 7 | Internet Explorer | Page Render | URL/Server | 377 — www.bing.com/random | Medium/Yes — 397 |
| 308 — 8 | Internet Explorer | Page Render | URL/Server | 378 — www.bing.com | Low/ No — 398 |
| 309 — 9 | Internet Explorer | Page Render | URL/Server | 379 — www.bing.com | Low/ No — 399a |
| 310 — 10 | Internet Explorer | Page Render | URL/Server | 380 — www.bing.com/random | Medium/Yes — 399b |
| 311 — 11 | Internet Explorer | Page Render | URL/Server 381 | www.bing.com/maps/address 3 | High/ Yes — 399c |

300

315 — Risk Index High

An Act Of Comparing The Data Values Having The Same Combination Of The One Or More Parameters
510

An Act Of Determining That The Compared Data Values Satisfy A Threshold That Is Indicative Of Whether A Data Value Is Unique In Relation To The Other Data Values
520

An Act Of Determining A Total Amount Of The One Or More Data Values That Have Been Determined To Be Unique
610

An Act Of Comparing The Total Amount Of The One Or More Data Values That Have Been Determined To Be Unique To A Risk Threshold That Is Indicative Of The Risk Of The Accessed Data Including The PII Data
620

*Figure 6*

PATTERN-LESS PRIVATE DATA DETECTION ON DATA SETS

BACKGROUND

Personal identifiable Information (PII) data is among the top priorities and a high risk for data driven companies. In the recent years there has been a huge investment to improve data driven development. This involves extensive data sets of feedback and telemetry data collected actively and passively directly from customers and their devices. There is an inherent risk of collecting private data from customers both intentionally and accidentally. Being able to detect and correct such mistakes is critical to deliver the privacy protection level that often is promised to customers.

PII has been traditionally detected using common pattern matching algorithms. As an example, common patterns may include email addresses, phone numbers or SSN numbers. In order to detect PII data with traditional mechanisms, it is often necessary to create a pattern and a set of rules to test each data value. In essence, it is necessary to know what PII data to look for in order to find it. This is very limiting as most PII data does not follow patterns like passwords.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems, methods, and computer readable medium for determining a risk or the likelihood that collected telemetry data includes Personal Identifiable Information (PII) data. In one embodiment, a system includes a processor and a system memory. The system instantiates in the system memory an organization module that organizes accessed data. The accessed data is associated with parameters that describe information corresponding to the data. The accessed data is organized into data sets having the same combination of the parameters with each data set including a data value determined by the parameters. The system also instantiates in the system memory a uniqueness determination module that determines data values that are unique in relation to the other data values. The system also instantiates in the system memory a risk estimation module that determines, based on the one or more data values that are determined to be unique, the likelihood that the accessed data includes PII data for the combination of parameters.

In another embodiment, data that is associated with one or more parameters that describe information corresponding to the data is accessed. The data is organized into data sets having the same combination of parameters. Each data set includes a data value determined by the combination of the parameters. The data values that are unique in relation to the other data values are determined. The likelihood that the accessed data includes PII data for the combination of parameters is determined based on the data values that are determined to be unique.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3C includes embodiments of a table including collected telemetry data that can be used to determine the likelihood that the collected telemetry data includes PII data;

FIG. 5 illustrates a flow chart of an example method for determining one or more data values that are unique in relation to the other data values; and FIG. 6 illustrates a flow chart of an example method for determining the likelihood that the accessed data includes PII data for the combination of parameters.

DETAILED DESCRIPTION

Figure 1:
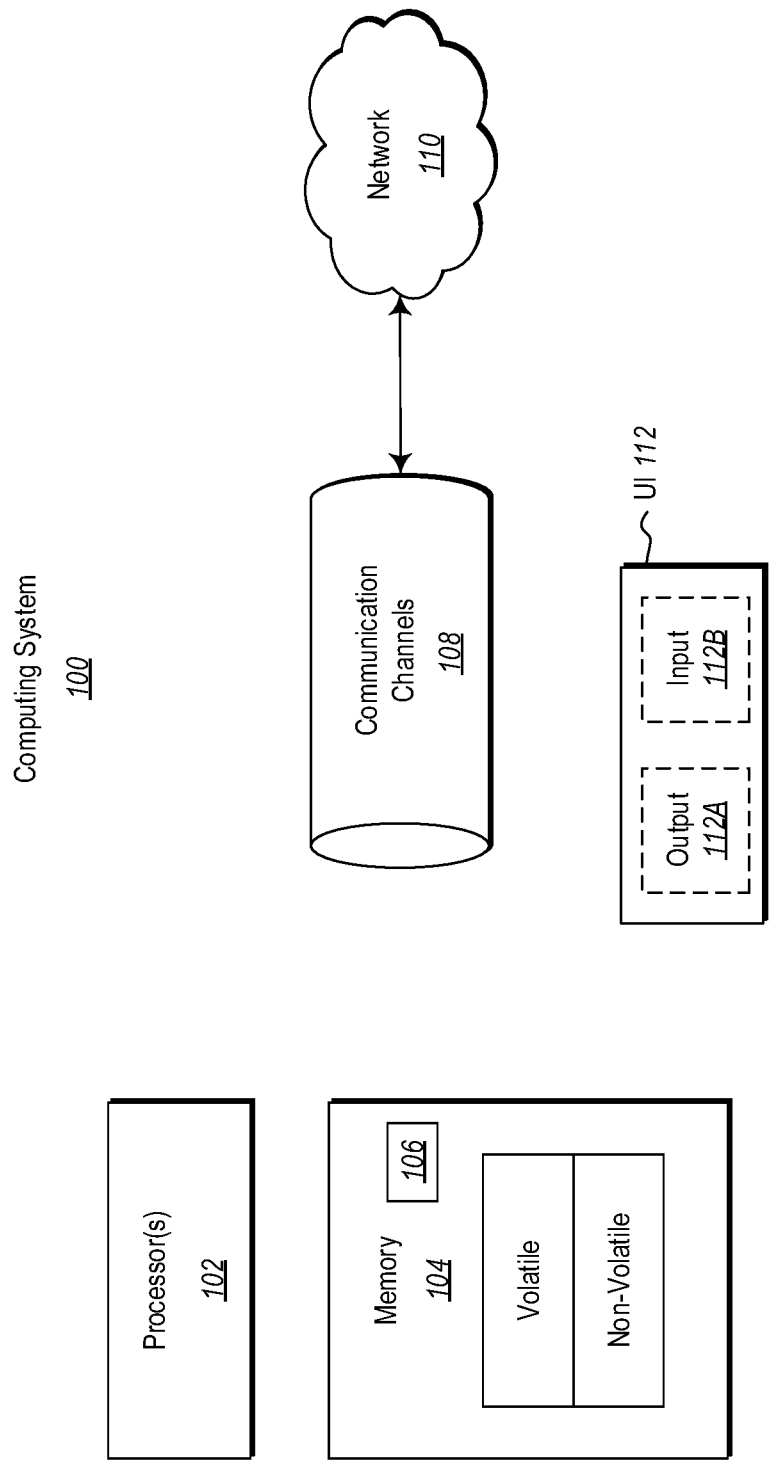
FIG. 1 illustrates an example computing system in which the principles described herein may be employed.

With the increasing transition of software applications from on-premises to cloud based solutions, telemetry data is collected more than ever and Application Performance Management (APM) is becoming an increasingly important part of software applications' success. With the increase of APM, there is also a growing need for log analysis. Accordingly, large amounts of telemetry data are routinely collected for various purposes, such as failure analysis and the like. In addition, the telemetry data may be collected to aid in data driven development as the telemetry data is analyzed to find better ways to develop a software application.

Typically, to collect the telemetry data, a collection mechanism is developed which specifies when the telemetry data is to be collected and also specifies which telemetry data to collect. For example, the collection mechanism may specify that anytime a given failure occurs, the telemetry data should be collected and stored. The collected data may then be analyzed to learn about the cause of the failure. In other instances the collection mechanism may specify that all telemetry data for a given time period or geographical area should be collected. Thus, it will be appreciated that the telemetry data may be collected for any reasonable purpose and the collection mechanism may be designed to collect the telemetry data for the reasonable purpose.

The collection mechanism will typically be coded so as to collect the telemetry data for the given purpose (i.e., failure analysis) and then be provided to a large number of computing devices, including desktop computer, laptop computers, mobile phones, and other mobile computing systems. The collection mechanism will then collect the telemetry data according to the purpose it was designed for and provide the collected data for further analysis.

One large risk when collecting the large amounts of telemetry data is that Personal Identifiable Information (PII) data will be included in the collected telemetry data, often accidently as the collection mechanisms may inadvertently collect the PII data. PII data may include any type of data or information that may be used to infer the identity of the user of the computing device that collected the data or have the ability to actually identify the user. Examples include sensitive information including, but not limited to, names, physical and email addresses, phone numbers, passwords, account numbers, financial information, Social Security Numbers (SSN), membership numbers, or the like. Sensitive PII data may typically be used to actually identify the user.

However, PII data is also defined to include any data that, while not being directly sensitive data, may nonetheless be used to infer through association user identity. Examples include, but are not limited to, text indicating that someone is going to a particular sporting event, a calendar entry indicating a particular event such as meeting at a given time, or a serial number from a particular device. This type of PII data will not typically actually identity the user, but may be used to infer the identity of the user is many instances since it has some connection to a particular user. Accordingly, the definition of PII data as used in the embodiment disclosed herein should be broadly interpreted.

Typically the party that collects the telemetry data and then analyzes the data is software development company or the like that uses the collected data for the purpose previously discussed. Such companies, however, do not want to collect PII data as this will often violate the privacy protection levels promised to the customers, which may generate ill will or legal liability.

Accordingly, such companies are interested in being able to detect the collection of any PII data so that changes may be made to the collection mechanisms to prevent further collection.

PII has been traditionally detected using common pattern matching algorithms. As an example, common patterns may include email addresses, phone numbers or SSN numbers. In order to detect PII data with traditional mechanisms, it is often necessary to create a pattern and a set of rules to test each data value. In essence, it necessary to know what PII data to look for in order to find it. This is very limiting as most PII data does not follow patterns like passwords.

Advantageously, the embodiments disclosed herein provide for systems, methods, and computer readable media that is able to determine the risk or likelihood that collected telemetry data includes PII data without following any known patterns. Rather, the embodiments disclosed herein determine the uniqueness of data values in collected data sets of the telemetry data. The uniqueness of the data values is then used to determine the risk of collected PII data.

There are various technical effects and benefits that can be achieved by implementing aspects of the disclosed embodiments. By way of example, it is now possible to determine the likelihood that collected telemetry data includes PII data without having to know a pattern matching algorithm ahead of time. In addition, it is now possible to determine the uniqueness of data values. Further, the technical effects related to the disclosed embodiments can also include improved user convenience and efficiency gains.

Some introductory discussion of a computing system will be described with respect to FIG. 1. Then, the system for determining without the use of a known pattern the risk or likelihood that telemetry data includes PII data will be described with respect to FIG. 2 through FIG. 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
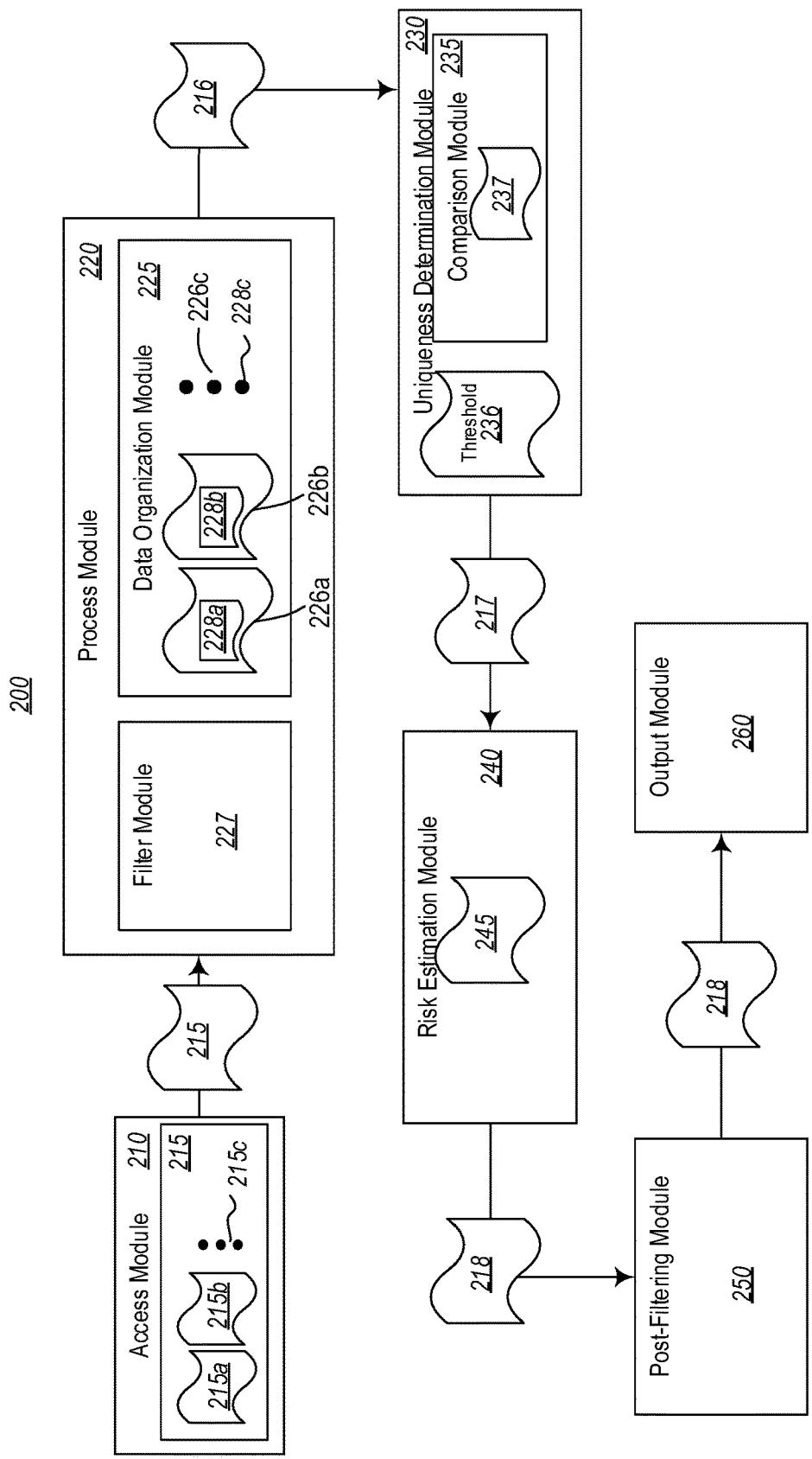
FIG. 2 illustrates an embodiment of a computing system that is able to determine the likelihood that collected telemetry data includes PII data without using a known pattern.

Attention is now given to FIG. 2, which illustrates an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIG. 2 and some of the components may be combined as circumstances warrant. Although not necessarily illustrated, the various components of the computing system 200 may access and/or utilize a processor and memory, such as processor 102 and memory 104, as needed to perform their various functions.

As illustrated in FIG. 2, the computing system 200 includes a data access module 210. In operation, the data access module 210 receives or accesses data 215 from one or more sources that are typically external to the computing system 200, for example from a database that is designed to store the data 215. The data 215 may be any type of data. In one specific embodiment, the data 215 may be telemetry data that is collected from a large number of external computing devices for further analysis. Accordingly, for ease of explanation the data 215 may herein after also be referred to as telemetry data. For example, the telemetry data may include failure data generated by exceptions thrown during code execution, application crashes, failed server requests or similar events. The telemetry data may also include data collected from the large number of external computing devices for performance analysis. It will be appreciated that the telemetry data 215 may be any reasonable type of telemetry data that is collected for any reasonable purpose.

The telemetry data 215 may include parameters 215a, 215b, and any number of additional parameters as shown by ellipses 215c. The parameters 215a, 215b, and 215c (hereinafter also referred to "parameters 215") describe information related to the data 215 that may be used to categorize and organize the data 215 as will be explained in more detail to follow. For example, the parameters may include information about the data such as geographical information, application version information, error codes, operating system and version information, device type, events or instances of a specific operation, or the like. It will be appreciated that there may be any number of different types of parameters and that the embodiments disclosed herein are not limited by the types of parameters that are associated with the failure data 215. Accordingly, the embodiments and the claims disclosed herein are not limited by the type of the telemetry data 215 and associated parameters 215a, 215b, and 215c.

In addition to including the parameters 215 that describe information related to the telemetry data 215, the telemetry data 215 may also include Personal Identifiable Information (PII) data that has been collected in the data. Typically, the PII data has been collected due to an error in the instructions that govern how the data is collected. That is, the party or user that is interested in using the telemetry data for a specific purpose, such as failure analysis, will generate a collection mechanism or the like that specifies how the telemetry data is to be collected. The collection mechanism, however, will not typically try to collect PII data since such information should not be provided to the party using the telemetry data. However, in some instances the collection mechanism will collect the PII data along with the intended data because the collection mechanism has been inadvertently coded to do so.

In other instances, the PII data may be collected due to user miss-use of one or more features of a program or the like. For example, a user may input PII data in a place that is not meant for the collection of PII data. This may inadvertently lead to the accidental collection of the PII data.

Accordingly, the embodiments disclosed herein provide a mechanism to determine if the collected the telemetry data 215 includes PII data or at least to determine if there is a potential risk that the collected telemetry data includes PII data. The determination of the risk that PII data has been collected may be performed by determining if the collected telemetry data includes data values that are unique when compared with other data values associated with the same parameters 215 as will be explained in more detail to follow. Advantageously, there is no need to use a predetermined pattern when determining if the collected data includes PII data since the embodiments disclosed herein rely on the uniqueness of the data values themselves rather than any known pattern.

Returning to FIG. 2, the computing system 200 may also include a process module 220 that is configured to provide processing on the telemetry data 215. The preprocessing module may also include a data organization module 225. In operation, the data organization module 225 organizes or groups the telemetry data 215 into one or more data sets 226a, 226b, or any number of additional data sets as illustrated by the ellipses 226c (hereinafter referred to as data sets 226) based on matching or shared combinations of the parameters 215a, 215b, and 215c. That is, the data organization module 225 organizes the telemetry data by grouping the telemetry data that are related by having matching combinations of specific parameters into the data sets 226. As will be appreciated, the combination of the parameters 215 may be determined by the purpose for which the telemetry data is collected. For example, if the purpose were to do failure analysis, then perhaps the combination of the parameters 215 would be those parameters related to a specific operational failure.

Each of the data sets 226 may include a data value or data point 228 that is determined by the combination of the parameters 215 for the data sets. That is, the data value 228 is the actual data value that is based on the combination of the parameters. In the illustrated embodiment, the data set 226a includes a data value 228a, the data set 226b includes a data value 228b, and the data set 226c includes a data value 228c.

In one embodiment, the processing module 220 may include a filtering module 227 that is configured to perform filtering based on the parameters 215 to determine those parameters that are always (or almost always) unique to a data set 226 of the telemetry data 215. For example, in one embodiment, the filtering module 227 may, for each parameter 215a, 215b, and 215c, analyze the distribution of its value on all the telemetry data 215, keeping only parameters contained in a large number of data sets while filtering away parameters only belong to one or a very small number of the data values.

For instance, the data sets 226 may include such parameters as a time stamp that is generated when the data value was collected or a randomly generated anonymous ID for a specific computing device. As will be appreciated, these types of parameters are almost always unique for each data value. Accordingly, the filtering module 227 may remove these parameters prior to determining if the data includes any PII data.

In some embodiments, the telemetry data 215 may include multiple instances of a data set 226 that is collected from the same computing device, although perhaps at a different time. Since there may be no need to analyze the multiple instances, the filtering module 227 may also be configured to remove the multiple instances of a data set. The filtering module 227 may also provide data cleansing and other related procedures.

Turning now to FIG. 3A, an example embodiment of the telemetry data 215 that has been organized by the organization module 225 into data values according to matching parameters is illustrated. As shown in FIG. 3A, the telemetry data is organized into a table 300. It will be noted that showing the telemetry data organized as a table is for ease of illustration only and that the organization module 225 may organize the telemetry data in any other reasonable way.

As shown, the table 300 includes telemetry data sets 301a-312 that may correspond to specific instances of the telemetry data 215 previously discussed. It will be noted that the ellipses shown for the telemetry data record 312 represent that there may be numerous additional telemetry data sets included in the table 300 and typically the table 300 will include a large number of telemetry data sets, usually hundreds of millions or more. It will be further noted that the table 300 is a simplified version that is used to illustrate the embodiments disclosed herein. Accordingly, the actual structure of the table 300 should not be used to limit the embodiments disclosed herein.

As shown in FIG. 3A, each of the telemetry data sets 301a-312 are associated with a device ID 320 that is assigned by the computing system 200. The device ID 320 may be used to identify which computing device the telemetry data was collected from. For example, the telemetry data sets 301a and 301b are assigned the device ID 1 since both of these data sets were collected from the same computing device, which may be a desktop or laptop computer, mobile computing device such as a smart phone, or any other type of computing device. The telemetry data set 302 is assigned the device ID 2 to show that is collected from a different computing device than the instances 301a and 301b. In like manner the remaining telemetry data sets are also assigned a specific device ID when they are collected from different computing devices.

As also shown in FIG. 3A, the telemetry data sets 301a-312 are associated with various parameters 330, 340, 350, and 360 that may correspond to the parameters 215a, 215b, and 215c. As previously described, the combination of the parameters that is used by the organization module 225 when organizing the data is typically based on the purpose for which the data was collected. For example, in the illustrated embodiment the purpose of the data collection may be to examine page rendering, for example rendering speeds and the like, for specific webpages using Internet Explorer.

Accordingly, as shown the parameter 330 corresponds to a time stamp that specifies the time and date that each instance of the telemetry data was collected. In some embodiment, only telemetry data 215 that is collected within a given time period is used in the embodiments disclosed herein. This helps to ensure that the data sets are collected under similar circumstances as the data sets are to be compared with each as will be explained in more detail to follow. In other embodiments, however, the data collection may not be limited to a specific time period and in such embodiments the table 300 may not include the time stamp parameter 230.

Although not illustrated, in some embodiments additional parameters may also be used to further define the data sets and their respective data values as needed. For example, a parameter may specify a specific geographical location so that only those data sets collected at the specific geographical location are included in the table 300. Likewise, a further parameter may specify that only telemetry data collected from a specific type of device such as a mobile device or a desktop computer be included in the table 300. In this way, it is possible to further refine the collected data as needed.

As further shown, parameter 340 corresponds to a provider type, which is this case is Internet Explorer. The parameter 350 corresponds to a webpage render for Internet Explorer. The parameter 360 corresponds to the URL and server that are accessed when rendering the webpage. The final element in the table 300 is a data value 370. The data value 370 is the actual data value that is based on the combination of the parameters. In the illustrated embodiment, the data value 370 for each of the data sets 301a-312 is the content of the webpage that has been rendered. Accordingly, the table 300 only shows those data values 370 that have the same combination of the parameters 330-360.

In the illustrated embodiment, data values 371a, 371b, 373, 375, 376, 378, 379, and 381 are shown as www.bing.com. The data value 372 is shown as www.bing.com/maps/address1. The data value 374 is shown as www.bing.com/maps/address2. The data values 377 and 380 are shown as www.bing.com/random, where "random" is meant to imply some random website or random data from a website. The data value 381 is shown as www.bing.com/maps/address3. The data values 370 will be described in further detail to follow.

As previously mentioned, in some embodiments the computing system 200 includes the filter module 227. FIG. 3B illustrates a specific example of the operation of the filtering module 227. As shown in FIG. 3B, the filtering module 227 filters out the parameter 330 that includes the time stamps. As previously discussed, parameters such as the time stamps 330 are too unique in that a given time stamp will almost always be associated with a single data set 301-312. By filtering such parameters, the computing system 200 is better able to determine those data sets that actually do include unique data. The filtering module 227 may also filter out other non-illustrated parameters that are too unique.

The filter module 227 may also remove multiple instances of a data set that are collected from the same device. As shown in FIG. 3A, the data sets 301a and 301b were collected from the same device, thus both share the same device ID 1. However, the embodiments disclosed herein only need a single instance when determining the risk of the data including PII data. Accordingly, as shown in FIG. 3B the filter module 227 is able to remove the data set 301*b* from the table 300.

Returning to FIG. 2, the computing system 200 may further include a uniqueness determination module 230. In operation, the uniqueness determination module 230 receives the organized telemetry data, shown at 216, from the organization module. The uniqueness determination module 230 may then determine whether a given data value 228 (370) is unique in comparison to the other data values.

In one embodiment the uniqueness determination may be partially performed by comparing a given data value 228 (370) with all of the other data values having the same combination of parameters 215. Accordingly, the uniqueness determination module 230 may include a comparison module 235 that in operation compares the various data values to the other data values to determine if the data value is unique. In some embodiments, the comparison module 235 may assign a uniqueness index 237 to each of the data values 228 as will be explained in more detail to follow.

The uniqueness determination module 230 may also include a threshold 236 that may also be used in the uniqueness determination. In operation, the threshold 236 is configured to help verify that the data value 227 (370) is indeed unique. For example, the threshold 236 may set an upper bound on how many times a given data value 228 may occur before it is no longer considered unique. In addition, the threshold 236 may specify other factors that should be satisfied such as temporal or geographical factors in order to be considered unique. In those embodiments where the comparison module 235 assigns the uniqueness index 237, the threshold 236 may specify which index values are considered unique and which index values are considered not unique.

FIG. 3C illustrates a specific example of the operation of the uniqueness module 230. It will be appreciated that although, as discussed in relation to FIG. 3A, the table 300 will typically include numerous data sets and corresponding data values, for ease of explanation of the operation of the uniqueness module 230 the discussion will assume only the 11 data sets and corresponding data values shown in FIG. 3C.

The uniqueness module 230, specifically the comparison module 235, may compare the data value 371*a*, which is www.bing.com, with all of the other data values 370 to determine if this data value appears to be unique. In the illustrated embodiment, there are five other instances of www.bing.com, namely data values 373, 375, 376, 378, and 379. Accordingly, when the comparison module 236 compares the data value 371*a* with the other data values 370, the comparison module may find that there are five other instances of this value and may determine that based on a sample of 11 data values, having six instances is not unique.

In some embodiments the comparison module 235 may assign a uniqueness index value 390 to each of the data values based on the comparison. In the case of data value 371*a*, the comparison module 235 may assign a uniqueness index 391. As shown in FIG. 3C, the uniqueness index 391 is listed as "Low". This is to represent that data value 371*a* has been given a low uniqueness index value since there are five other data values 370 having the same value.

In some embodiments the comparison module 235 may apply the threshold 236 to help determine that the data value 371a is not unique. In such embodiments, the threshold 236 may specify that any number of instances of a data values over a certain value is not to be considered unique. In the embodiment of FIG. 3C where only 11 data sets are being considered, suppose the threshold 236 specifies that any number of instances over two is not unique. Accordingly, since there are six instances of www.bing.com, applying the threshold 236 would cause the comparison module 235 to determine the data value is not unique as indicated by the "No" shown in FIG. 3C. Of course, the threshold 236 may also specify other factors as well as was previously described. The threshold 236 may also specify that a Low uniqueness index is not to be considered as unique.

In like manner, the comparison module 235 may compare the data values 373, 375, 376, 378, and 379 with all of the other data values 370. As in the case of the data value 371*a*, since there are five other instances of www.bing.com the comparison module 235 may determine that these data values are also not unique. In the embodiments where the comparison module assigns a uniqueness index, the data value 373 may be assigned a uniqueness index 393, the data value 375 may be assigned a uniqueness index 395, the data value 376 may be assigned a uniqueness index 396, the data value 378 may be assigned a uniqueness index 398, and the data value 379 may be assigned a uniqueness index 399*a*. As shown in FIG. 3C, the uniqueness indexes 393, 395, 396, 398, and 399*a* are listed as "Low", indicating that these are each low index values. The comparison module 235 may also apply the threshold 236 in the same manner as was described for data value 371*a*.

The comparison module may also compare the data value 372 with all the other data values. As shown in FIG. 3C, there is only one instance of data value 372, which is www.bing.com/address/address1. Accordingly, the comparison module 235 may determine that one instance in the sample of 11 is unique. In the embodiments where the comparison module assigns a uniqueness index, the data value 372 may be assigned a uniqueness index 392. As shown in FIG. 3C, the uniqueness index 392 is listed as "High". This is to represent that data value 272 has been given a high uniqueness index value since there are no other data values 370 having the same value.

Likewise, the comparison module may also compare the data value 374 with all the other data values. As shown in FIG. 3C, there is only one instance of data value 374, which is www.bing.com/address/address2. Accordingly, the comparison module 235 may determine that one instance in the sample of 11 is unique. In the embodiments where the comparison module assigns a uniqueness index, the data value 374 may be assigned a uniqueness index 394. As shown in FIG. 3C, the uniqueness index 394 is listed as "High". This is to represent that data value 374 has been given a high uniqueness index value since there are no other data values 370 having the same value.

Similarly, the comparison module may also compare the data value 381 with all the other data values. As shown in FIG. 3C, there is only one instance of data value 381, which is www.bing.com/address/address3. Accordingly, the comparison module 235 may determine that one instance in the sample of 11 is unique. In the embodiments where the comparison module assigns a uniqueness index, the data value 381 may be assigned a uniqueness index 399*c*. As shown in FIG. 3C, the uniqueness index 399*c* is listed as "High". This is to represent that data value 381 has been given a high uniqueness index value since there are no other data values 370 having the same value.

The comparison module 235 may also apply the threshold 236 when determining that the data values 372, 374, and 381 are unique. For example, as previously discussed in this embodiment the threshold 236 specifies that any number of instances over two is not unique. Accordingly, since there is only one instance of the data values 372, 374, and 381, applying the threshold 236 would cause the comparison module 235 to determine the data values 372, 374, and 381 are unique as indicated by the "Yes" shown in FIG. 3C. The threshold 236 may also specify that a High uniqueness index is to be considered unique.

The comparison module 235 may also compare the data values 377 and 380 with all the other data values. As shown in FIG. 3C, there are two instances of data values 377 and 380, which is www.bing.com/random. Accordingly, the comparison module 235 may determine that two instances in the sample of 11 may be unique. In the embodiments where the comparison module assigns a uniqueness index, the data values 377 and 380 may be assigned a uniqueness index 397 and 399*b*. As shown in FIG. 3C, the uniqueness indexes 397 and 399*b* are listed as "Medium". This is to represent that the data values 377 and 380 have been given a uniqueness index that is between the High uniqueness index value given to data values 372, 374, and 381 and the Low uniqueness index value given to the other data values. The Medium uniqueness index value represents that these data values have a given number of instances that may be unique in comparison to those with a Low uniqueness index value, but perhaps are not as unique as those data values with a High uniqueness index value.

The determination of whether a Medium uniqueness index is unique or not may be determined by applying the threshold 236 or in some other reasonable way. For example, as previously discussed in this embodiment the threshold 236 specifies that any number of instances over two is not unique. Accordingly, since there is two instance of the data values 377 and 380, applying the threshold 236 would cause the comparison module 235 to determine the data values 377 and 380 are unique as indicated by the "Yes" shown in FIG. 3C. The threshold 236 may also specify that a Medium uniqueness index is to be considered unique. Of course, in other embodiments the threshold 236 may specify that a Medium uniqueness index is not to be considered unique.

Returning to FIG. 2, the computing system 200 may further include a risk determination module 240. In operation, the risk determination module receives the uniqueness determination for the telemetry data, seen at 217, from the uniqueness determination module 230. The risk determination module 240 may then determine, based on the uniqueness of each data value, if there is a risk that the collected telemetry data 215 is likely to include PII data for the given combination of parameters. In other words, the risk determination module 240 uses the uniqueness information about each data value as a guide to determine if the telemetry data was that was collected and organized based on the given combination of parameters as previously discussed includes PII data.

In one embodiment, the risk determination module 240 may determine the total number of data values 228 (370) that were determined to be unique by the uniqueness determination module 230. If the total number of data values that were determined to be unique is found to be a relatively high number, then it may be inferred that the telemetry data has a relatively high risk of including PII data for the given combination of parameters. Of course, it is possible that the high number of data values that were determined to be unique is caused by random data that is not related to PII data. However, the fact that there is a relatively high number of data values found to be unique may cause further investigation to determine if the data values actually do include PII data.

In some embodiments, the risk determination module 240 may also include a risk threshold 245 that may indicate the risk that the collected or accessed telemetry data includes PII data for the given combination of parameters. In those embodiments that include the risk threshold 245, the risk threshold may be used in determining the risk that PII data has been collected. For example, in some embodiments the risk threshold 245 may specify a certain value for the total number of data values that were determined to be unique that should be found before it is determined that there is a risk that PII data is being collected. Said another way, the risk threshold 245 sets an upper bound on the number of unique data values that may be collected before there is a risk that the unique data values represent PII data.

Of course, it will be appreciated after reading this specification that in some instances the total number of data values determined to be unique may be below the risk threshold 245 and yet some of the unique data values may in fact include PII data. In such circumstances, a determination has been made that the risk of the telemetry data including PII does not warrant the time or computing resources to determine if there is in fact PII data included. That is, the risk threshold 245 is set at a value that includes a tradeoff between the potential desirability to find all instances of PII data and the need to use time and computing resources in an efficient manner.

The operation of the risk determination module 240 will now be described for the embodiment shown in FIG. 3C. As previously described, for ease of explanation of the operation of the risk determination module 240 the discussion will assume only the 11 data sets and corresponding data values shown in FIG. 3C. FIG. 3C shows that the uniqueness determination module 230 has determined that data values 372, 374, 377, 380, and 381 are unique when compared to the rest of the data values 270.

The risk determination module 240 may then determine if the combination of the parameters 340-360 is likely to include PII data in the collected telemetry data. For example, the risk determination module may determine that having five unique data values out of a total of 11 data values does include a risk that it is likely that the collected telemetry data includes PII data since almost half of the data values are unique. In those embodiments including the risk threshold 245, the risk threshold may specify that five unique data values out of 11 total data values is likely to include the PII data.

In some embodiments, the risk determination module 240 may assign a risk index to the collected telemetry data based on its determination. As shown in FIG. 3C, the risk determination module 240 has assigned a risk index 315. This index is listed as "High" to represent a high value.

As previously mentioned, it is possible for the collected telemetry data 215 to have a large number of unique data values that are unrelated to PII data. That is, the collected telemetry data may include random data that is caused by computing anomalies. Alternatively, the combination of the parameters used to determine how the telemetry data is collected may be collecting other types of data that is not necessarily PII data, but that is not intended to be collected. Accordingly, it is possible for the risk determination module to assign a high risk index to a set of collected telemetry data that only includes a small amount (or none at all) of PII data.

Accordingly, as shown in FIG. 2, the computing system 200 may also include a post-filtering module 250 and an output module 260. In operation, the post-filtering module 250 may receive the telemetry data where a risk of PII data has been determined, as seen at 218, from the risk determination module 240. The post-filtering module 250 may then perform post-filtering operations on the telemetry data 218. The post-filtering operations may include any filtering operations that remove unwanted or unneeded elements from the data 218.

In operation, the output module 260 may receive the telemetry data 218 from the post-filtering module 250 or, in those embodiments that do not include a post-filtering module 250, from the risk determination module 240. The output module 260 may provide the telemetry data to an end user, who may then use the results to further investigate if the combination of the parameters that have been determined to likely include PII data actually includes PII data.

For example, the embodiment of FIG. 3C was determined to be likely to include PII data because five of the total 11 data sets included unique data values 370. This data was therefore given a high risk index. Upon further examination, it may be determined that the collected telemetry data of FIG. 3C was properly given the high risk index.

The data value 372, as previously described, is www.bing.com/maps/address1. Upon examination of this data value, maps/address 1 is most likely PII data since maps/address1 will bring up a real location that was found when a user entered this data into www.bing.com. This location may be the user's home or work location or at the very least a location the user was interested in. Knowledge of this location may be used to determine the identity of the user, especially if the address was the home address.

Likewise, the data value 374 is www.bing.com/maps/address2 and the data value 381 is www.bing.com/maps/address3. Examination of these data values would determine that they also most likely include PII data since maps/address2 and maps/address3 would also bring up a real location that was found when a user entered this data into www.bing.com. As described above, this location could be used to determine the identity of the user.

The data value 377 is www.bing.com/random and the data value 380 is also www.bing.com/random. Examination of these data values may or may not determine that they are likely to include PII data. As mentioned before, "random" is meant to imply that this data value can be any value. In some embodiments, the random data will be caused by a computing anomaly that occurred at the time (or near the time) the telemetry data was collected and is unlikely to occur again. Accordingly, such random data would be unique, but would not include PII data. Alternatively, the random data may include other data that, while not PII data, may be data that was not intended to be collected. That is, as previously described, in the embodiment of FIGS. 3A-3C, the combination of the parameters was selected so as to return telemetry data related to page rendering of a webpage. However, in some embodiments the collection mechanism may also be collecting the additional unintended information in addition to what was intended.

Accordingly, once it is determined that the collected telemetry data does in fact include inadvertently collected PII data, the user or third party that initiated the data collection may be able to change the collection mechanism use to prevent further collection of the unwanted PII data. In those embodiments where unwanted random data that is not necessarily PII data is inadvertently collected, the collection mechanism may also be changed to prevent collection of the random data. Advantageously, the embodiments disclosed herein provide a way to determine that the collection mechanism should be changed in order to prevent the collection of the PII data or other unwanted random data.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
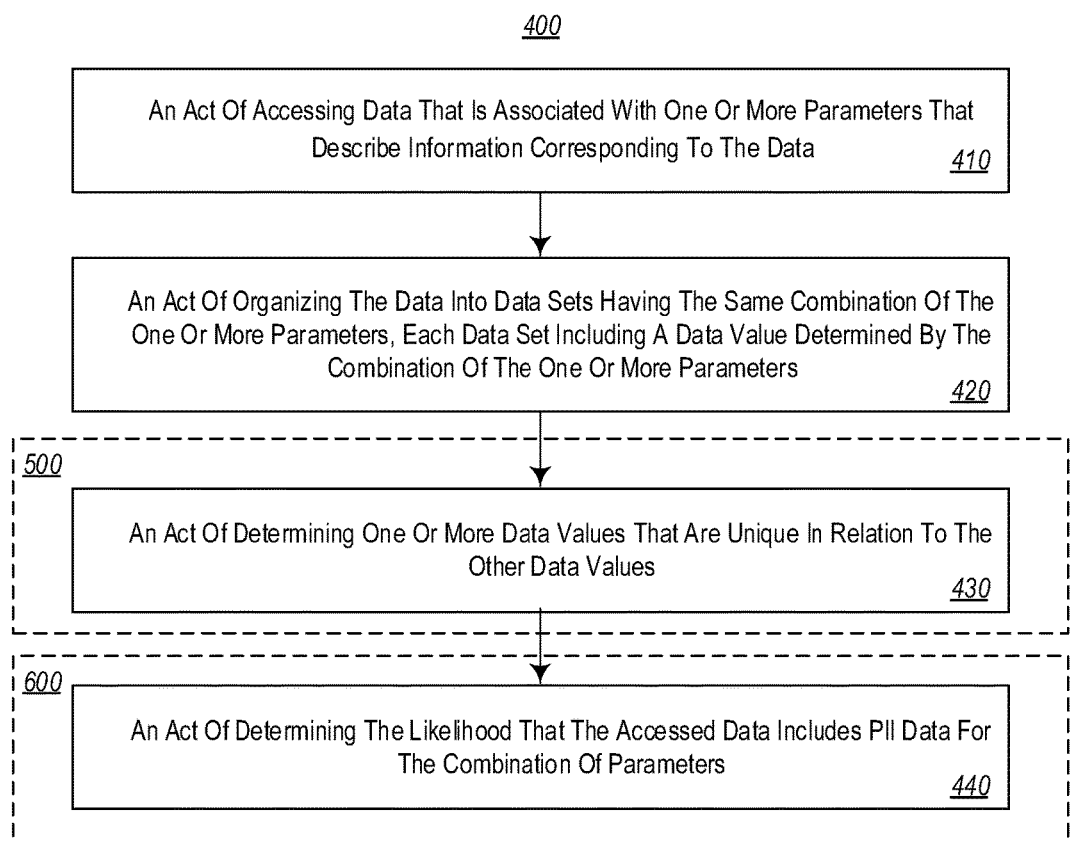
FIG. 4 illustrates a flow chart of an example method for determining the likelihood that collected telemetry data includes PII data without the use of known patterns.

FIG. 4 illustrates a flow chart of an example method 400 for determining the likelihood that collected telemetry data includes PII data without the use of known patterns. The method 400 will be described with respect to FIGS. 2 and/or 3A-3C discussed previously.

The method 400 includes accessing data that is associated with one or more parameters that describe information corresponding to the data (act 401). For example as previously described the access module 210 may access the telemetry data 215. The telemetry data may be associated with the parameters 215a, 215b, and 215c or the parameters 330-360.

The method 400 includes organizing the data into data sets having the same combination of one or more parameters (act 420). Each data set may include a data value determined by the combination of the parameters. For example, as previously described the data organization module 220 may organize the telemetry data into data sets 226 (301a-311) having data values 228 (370).

In some embodiments, the telemetry data is organized into a table 300 having rows with the data sets and columns with the parameters as shown in FIG. 3A. In other embodiments, a filter module 227 may filter out parameters such as time stamps that are almost always unique and/or duplicate data sets as shown in FIG. 3B.

The method 400 includes determining one or more data values that are unique in relation to the other data values (act 430). For example, as previously described uniqueness determination module 230 may determine those data values 228 (370) that are unique in relation to the other data values as shown in FIG. 3C. In one embodiment, the uniqueness determination may be made according to a method 500 that will be described in more detail to follow.

The method 400 includes determining, based on the one or more data values that are determined to be unique, the likelihood that the accessed data includes PII data for the combination of parameters (act 440). For example as previously described the risk estimation module 240 may determine a risk or the likelihood that the collected telemetry data includes PII data as also shown in FIG. 3C. In one embodiment, the likelihood determination may be made according to a method 600 that will be described in more detail to follow.

FIG. 5 illustrates a flow chart of a method 500 for determining one or more data values that are unique in relation to the other data values. The method 500 includes comparing the data values having the same combination of the one or more parameters (act 510). For example as previously described the comparison module 235 may compare the data values (228 (370) that have the same combination of parameters 330-360.

The method 500 includes determining that the compared data values satisfy a threshold that is indicative of whether a data value is unique in relation to the other data values (act 520). For example as previously described the uniqueness determination module 230 may determine if the compared data values satisfy the threshold 235.

FIG. 6 illustrates a flow chart of a method 600 for determining the likelihood that the accessed data includes PII data for the combination of parameters. The method includes determining a total amount of the one or more data values that have been determined to be unique (act 610). For example as previously described the risk determination module 240 may determine the total number or amount of the data values 370 that have been determined to be unique.

The method 600 includes comparing the total amount of the one or more data values that have been determined to be unique to a risk threshold that is indicative of the risk of the accessed data including the PII data (act 620). For example, as previously described the risk determination module 240 may compare the total number or amount of the data values 370 that have been determined to be unique to the risk threshold 245.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   at least one processor; and
   system memory having stored thereon computer-executable instructions that are executable by the at least one processor to cause the computing system to perform at least the following:
   configure a collection mechanism by coding the collection mechanism to collect data from a device executing the collection mechanism, the collection mechanism being coded to specify when the data is to be collected on the device and being coded to specify which information used by the device is to be included in the data;
   provide the collection mechanism to a plurality of external computing device(s) for execution by the plurality of external computing device(s);
   from each external computing device included in the plurality of external computing device(s), collect corresponding data from said each external computing device using the collection mechanism;
   combine the corresponding data received from the plurality of external computing device(s) to generate telemetry data;
   organize the telemetry data based on one or more parameter(s) that describe details regarding how the telemetry data was collected, wherein at least some of the telemetry data is organized into data sets that share a same combination of parameters included among the one or more parameter(s), and wherein each data set includes a corresponding data value such that a plurality of data values are associated with the telemetry data;
   identify, from among the plurality of data values, one or more data value(s) that are determined to be unique relative to other data values included in the plurality of data values;
   determine a likelihood that the telemetry data includes personal identifiable information (PII) data and assign a risk index to the telemetry data based on the determined likelihood; and
   in response to determining that the risk index of the telemetry data is higher than a risk threshold, change the collection mechanism to prevent further collection of the PII data.

2. The computing system of claim 1, wherein execution of the computer-executable instructions further causes the computing system to determine that a particular data value, which shares the same combination of parameters, is unique by comparing the particular data value against other data values sharing the same combination of parameters.

3. The computing system of claim 1, wherein a corresponding uniqueness index is assigned to each one of the one or more data value(s) identified as being unique.

4. The computing system of claim 3, wherein each uniqueness index includes a high uniqueness indicator, a medium uniqueness indicator, or a low uniqueness indicator.

5. The computing system of claim 4, wherein execution of the computer-executable instructions further causes the computing system to determine the likelihood by comparing a number of the one or more data value(s) that are determined to be unique to the risk threshold that is indicative of a risk of the telemetry data including the PII data.

6. The computing system of claim 1, wherein execution of the computer-executable instructions further causes the computing system to:
   filter out particular parameters that are determined to be of a type that is unique prior to determining that the one or more data value(s) are unique or, alternatively,
   filter out duplicate data instances included in the telemetry data.

7. The computing system of claim 1, wherein the PII data is data that can be used to identify a user of an external computing device that contributed to the telemetry data.

8. The computing system of claim 1, wherein the telemetry data is organized into a table, the table including rows corresponding to the plurality of data values and columns corresponding to the shared same combination of parameters.

9. The computing system of claim 1, wherein execution of the computer-executable instructions further causes the computing system to:
   provide an indication of the likelihood that the telemetry data includes the PII data to an end user.

10. A method for determining a risk that collected telemetry data includes Personal Identifiable Information (PII) data and for preventing further collection of PII data, the method being performed by a computing system and comprising:
    configuring a collection mechanism by coding the collection mechanism to collect data from a device executing the collection mechanism, the collection mechanism being coded to specify when the data is to be collected on the device and being coded to specify which information used by the device is to be included in the data;
    providing the collection mechanism to a plurality of external computing device(s) for execution by the plurality of external computing device(s);
    from each external computing device included in the plurality of external computing device(s), collecting corresponding data from said each external computing device using the collection mechanism;

combining the corresponding data received from the plurality of external computing device(s) to generate telemetry data;

organizing the telemetry data based on one or more parameter(s) that describe details regarding how the telemetry data was collected, wherein at least some of the telemetry data is organized into data sets that share a same combination of parameters included among the one or more parameter(s), and wherein each data set includes a corresponding data value such that a plurality of data values are associated with the telemetry data;

identifying, from among the plurality of data values, one or more data value(s) that are determined to be unique relative to other data values included in the plurality of data values;

determining a likelihood that the telemetry data includes PII data and assigning a risk index to the telemetry data based on the determined likelihood; and in response to determining that the risk index of the telemetry data is higher than a risk threshold, change the collection mechanism to prevent further collection of the PII data.

11. The method of claim 10, wherein determining that a particular data value, which shares the same combination of parameters, is unique is performed by comparing the particular data value against other data values sharing the same combination of parameters.

12. The method of claim 10, wherein a corresponding uniqueness index is assigned to each one of the one or more data value(s) identified as being unique.

13. The method of claim 12, wherein each uniqueness index includes a high uniqueness indicator, a medium uniqueness indicator, or a low uniqueness indicator.

14. The method of claim 13, further comprising:
comparing a number of data values, which are included in the one or more data value(s) and which are identified as being unique, to the risk threshold that is indicative of a risk of the telemetry data including the PII data.

15. The method of claim 10, further comprising:
filtering out particular parameters that are determined to be of a type that is unique prior to determining that the one or more data value(s) are unique; or
filtering out duplicate data instances included in the telemetry data.

16. The method of claim 10, wherein organizing the at least some of the telemetry data into the data sets comprises:
organizing the at least some of the telemetry data into a table including rows corresponding to the plurality of data values and columns corresponding to the shared same combination of parameters.

17. The method of claim 10, wherein the PII data is data that can be used to infer an identity of a user of an external computing device that contributed to the telemetry data.

18. The method of claim 17, wherein the PII data includes one or more of names, physical and email addresses, phone numbers, passwords, account numbers, financial information, Social Security Numbers (SSN), and membership numbers.

19. One or more hardware storage device(s) having stored thereon computer-executable instructions that are executable by one or more processor(s) of a computing system to cause the computing system to determine a risk that collected telemetry data includes Personal Identifiable Information (PII) data by causing the computing system to:

configure a collection mechanism by coding the collection mechanism to collect data from a device executing the collection mechanism, the collection mechanism being coded to specify when the data is to be collected on the device and being coded to specify which information used by the device is to be included in the data;

provide the collection mechanism to a plurality of external computing device(s) for execution by the plurality of external computing device(s);

from each external computing device included in the plurality of external computing device(s), collect corresponding data from said each external computing device using the collection mechanism;

combine the corresponding data received from the plurality of external computing device(s) to generate telemetry data;

organize the telemetry data based on one or more parameter(s) that describe details regarding how the telemetry data was collected, wherein at least some of the telemetry data is organized into data sets that share a same combination of parameters included among the one or more parameter(s), and wherein each data set includes a corresponding data value such that a plurality of data values are associated with the telemetry data;

identify, from among the plurality of data values, one or more data value(s) that are determined to be unique relative to other data values included in the plurality of data values;

determine a likelihood that the telemetry data includes PII data and assign a risk index to the telemetry data based on the determined likelihood; and in response to determining that the risk index of the telemetry data is higher than a risk threshold, change the collection mechanism to prevent further collection of the PII data.

20. The one or more hardware storage device(s) of claim 19, wherein the PII data is data that can be used to identify a user of an external computing device that contributed to the telemetry data.

* * * * *